May 19, 1970     D. L. BITTNER ET AL     3,512,648
FILTRATION COLUMN
Filed June 19, 1967     2 Sheets-Sheet 1
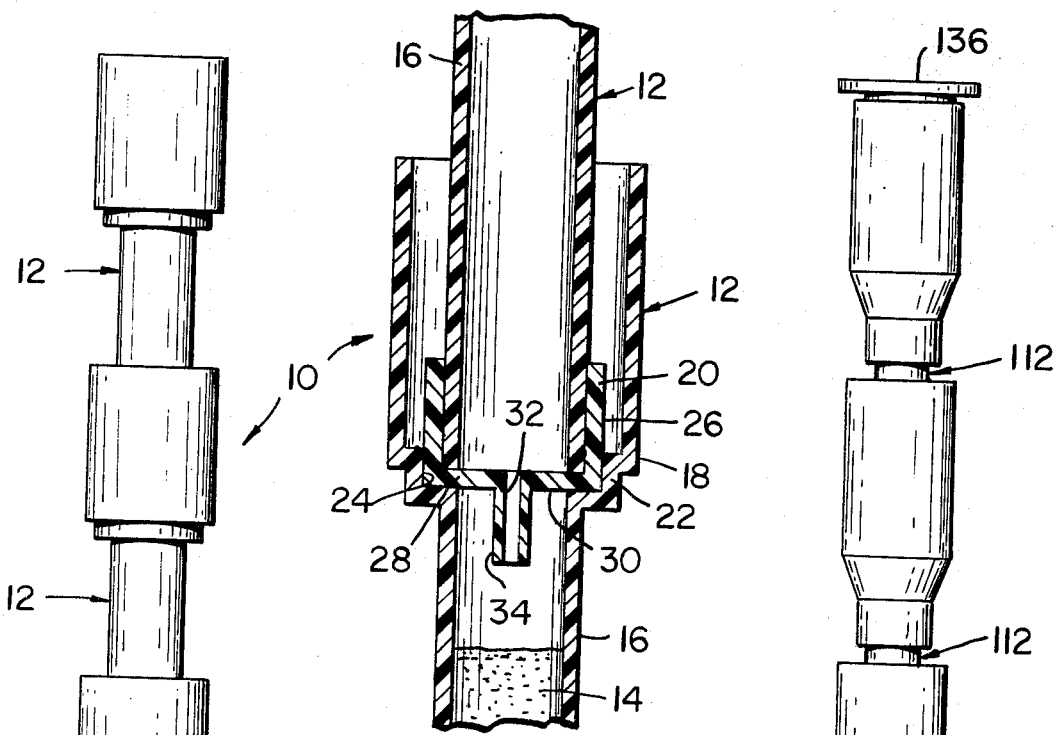
FIG_2
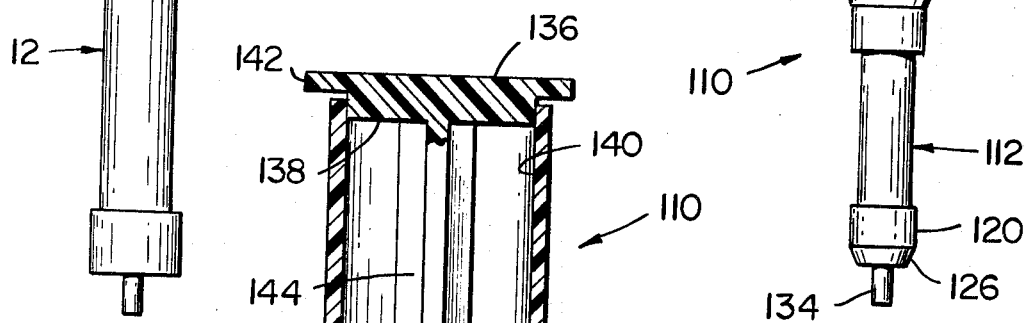
FIG_1     FIG_3
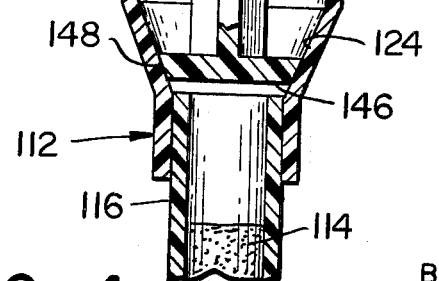
FIG_4
INVENTORS
DONALD L. BITTNER
MONROE MENDELSOHN
BY *Townsend and Townsend*
ATTORNEYS

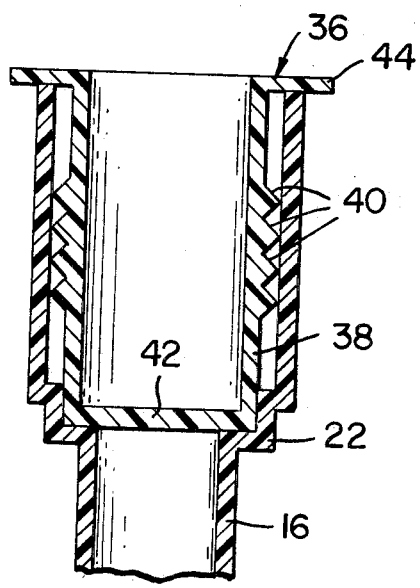
FIG_5
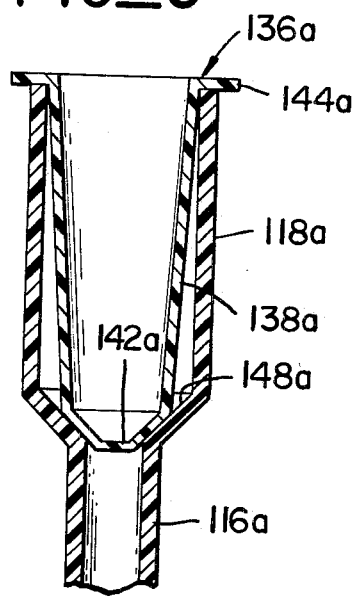
FIG_6
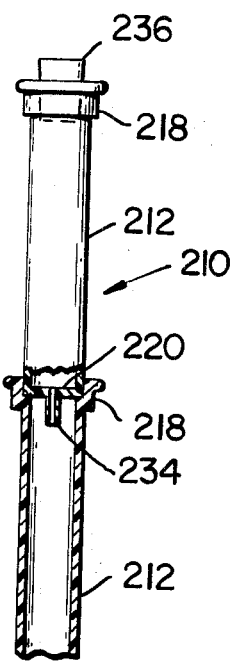
FIG_7
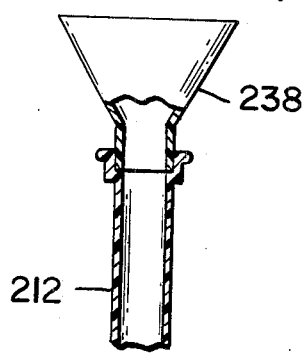
FIG_8
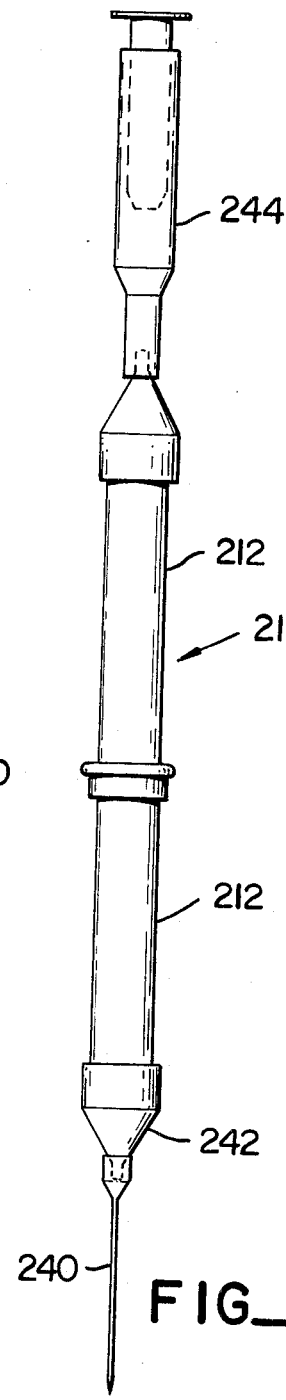
FIG_9
INVENTORS
DONALD L. BITTNER
MONROE MENDELSOHN
BY
Townsend and Townsend
ATTORNEYS United States Patent Office 3,512,648
Patented May 19, 1970

3,512,648
FILTRATION COLUMN
Donald L. Bittner, San Francisco, and Monroe Mendelsohn, Daly City, Calif.; said Mendelsohn assignor to Bio-Rad Laboratories, Richmond, Calif.
Filed June 19, 1967, Ser. No. 646,854
Int. Cl. B01d 25/02
U.S. Cl. 210—238        9 Claims

ABSTRACT OF THE DISCLOSURE

A filtration column comprised of a number of filter tubes arranged in end-to-end relationship and each containing a filter medium therein. The tubes are releasably interconnected and have complementary end portions so that the tubes can be interchanged with respect to each other to vary the manner of filtering a fluid passing through the tubes.

---

This invention relates to improvements in fluid filters and, more particularly, to a filtration column comprised of a number of interconnected, interchangeable filter tubes.

The present invention is directed to the provision of at least a pair of filter tubes, each tube containing a filter medium therewithin for filtering a fluid passing therethrough. Each tube has one end which is the complement of the opposite end, i.e., the outer configuration at one end is complementary to the inner configuration at the opposite end. The tubes are substantially identical in construction so that the one end of one tube can be complementally received within the opposite end of an adjacent tube, whereby the tubes can be stacked and can be interchangeably positioned as desired. Since the filter media in the tubes can have different filtering properties, the filtering action of the interconnected tubes may differ depending upon the relative positions of the tubes in the stack or column. Also, it may be desirable to filter a first fluid in one manner, i.e., with the tubes arranged in one order, while a second fluid is to be filtered in a second manner, i.e., with the tubes arranged in a second order. The tubes of the present invention, therefore, provide a means by which a fluid can be selectively filtered by passing it in sequence through a number of different filtering zones.

The present invention also contemplates the use of a cover for closing the entrance end of the endmost tube of the column. The cover prevents spillage of the filler material from the endmost tube of the column so that the column can remain intact either while it is being stored or being shipped from one point to another. The cover also maintains sanitary conditions at the entrance end of the column to assure that a fluid directed into the column will be uncontaminated.

It is the primary object of the present invention to provide a number of substantially identical filter tubes, each adapted to contain a filter medium and being constructed with one end thereof substantially complemental to the opposite end, so that the tubes can be interconnected in an end-to-end relationship with respect to each other to form a column of the tubes capable of filtering a fluid passing therethrough and being interchangeable to provide for different variations in the filtering actions of the filter media in the tubes.

Another object of the present invention is to provide a column of filter tubes of the type described wherein one end of each tube is provided with a tip which is complementally receivable within and frictionally engageable with an enlarged portion on the opposite end of an adjacent tube, whereby the tubes are releasably interconnected and can provide a flow path for a fluid to be filtered.

Still a further object of the invention is to provide a column of filter tubes of the aforesaid character wherein the enlarged portion of the endmost tube of the column is closed by a cover having an inner stopper element for plugging the endmost tube interiorly of the enlarged portion thereof to thereby maintain the filter medium in the tube as the column is shipped or stored and to maintain sanitary conditions at the entrance end of the column.

Another object of this invention is to provide a column having a removable plug and a removable funnel for the entrance end of the column, whereby the plug can be used to close the entrance end of the column when the latter is being shipped or stored and the funnel can be coupled to the entrance end when fluid is to be directed into the column.

Other objects of this invention will become apparent as the following specification progresses, reference being had to the accompanying drawing which illustrates several embodiments of the filtration column.

In the drawings:

FIG. 1 is a side elevational view of one form of the filtration column;

FIG. 2 is an enlarged, fragmentary, cross-sectional view of the column of FIG. 1;

FIG. 3 is a view similar to FIG. 1 but illustrating a second embodiment of the column;

FIG. 4 is an enlarged, fragmentary, cross-sectional view of the column of FIG. 3 showing one form of a cover for the entrance end of the column;

FIG. 5 is a view similar to FIG. 4 but showing a second form of the cover;

FIG. 6 is a view similar to FIGS. 4 and 5 but showing a third form of the cover;

FIG. 7 is a fragmentary, side elevational view, partly in section, of a third embodiment of the filtration column;

FIG. 8 is a sectional view of the entrance end of the column of FIG. 7; and

FIG. 9 is a side elevational view of a hypodermic needle unit using the column of FIG. 7.

One form of the filtration column of this invention is shown in FIGS. 1 and 2 and is broadly denoted by the numeral 10. Column 10 includes a number of releasably interconnected tubes 12 of substantially identical construction arranged in end-to-end relationship to form a single fluid passage. Each tube is provided with a filter medium 14 therewithin so that a fluid will necessarily pass through a number of filtration zones determined by the number of tubes in the column.

Each tube 12 has a central section 16 within which the filter medium is disposed. An enlarged portion 18 is secured to one end of section 16 and a tip member 20 is releasably coupled to the opposite end of the central section. Portion 18 is shown in FIG. 2 as being integral with section 16, but these components can be releasably coupled together if desired. Portion 18 has an annular, inner extension 22 provided with an inner surface 24 which is complemental to the outer surface 26 of member 20. The inner extremity of inner extension 22 defines a flat surface 28 surrounding the adjacent end of section 16. Portion 18 of the endmost tube 12 of the column serves to funnel fluid to be filtered into the proximal central section 12.

Tip member 20 has a flat end face 30 and an aperture 32 therethrough which communicates with a tubular projection 34 integral with the end of member 20.

In use, each tube 12 is provided with a suitable filter medium and then the tubes are stacked with the tip member 20 of one tube being complementally received within the extension 22 of an adjacent tube. In this position, the outer surface 26 of each tip member 20 frictionally engages the inner surface 24 of the corresponding extension 22 to releasably interconnect the adjacent pair of tubes. Also, face 30 of member 20 engages surface 28 of the corresponding extension 22 to limit the movement of the tubes toward each other. When all of the tubes have been connected to form column 10, the latter is ready to filter a fluid directed into the enlarger portion 18 of the outermost tube of the column.

Any suitable filter material can be used to form the filter medium 14 of each tube 12. For instance, the filter can be mechanically-acting, such as would be the case if glass wool or a cellulose derivative were used. Other types of filters include chemically-acting materials such as ion exchange resins.

The construction of column 10 allows the various tubes to be interchanged in any desired manner. For instance, it may be preferred that a fluid pass through a filtration zone having a mechanically-acting filter before it passes through a zone having a chemically-acting filter or vice versa. It may be desired to reverse or vary this sequence at a later time, whereupon the tubes can be readily interchanged since they can be immediately separated and quickly rearranged in the desired order.

Another embodiment of the filtration column of this invention is denoted by the numeral 110 and is illustrated in FIGS. 3 and 4. Column 10 includes a number of releasably interconnected tubes 112 arranged in end-to-end relationship in the same manner as described above with respect to column 10. Each tube 112 has a filter medium 114 in the central section 116 of the tube. An enlarged portion 118 is coupled to section 116 at one end thereof and a tip member 120 is coupled to the opposite end of section 116.

Each enlarged portion 118 has a conical inner surface 124 which is complementary to a conical inner surface 126 on each tip member 120. Both portion 118 and member 120 are releasably connected to section 116, member 120 having an aperture therethrough communicating with a tubular projection 134.

A cover 136 is provided to close the outer open end of the endmost enlarged portion 118 of column 110. Cover 136 has an inner, annular projection 138 which frictionally engages the cylindrical inner surface 140 of portion 118. The cover has an annular flange 142 which facilitates removal from the end of the corresponding portion 118.

A stem 144 integral with cover 136 extends laterally therefrom and has a stopper element 146 provided with a conical outer surface 148 engageable with surface 124 of portion 118 when cover 136 closes the open end of the portion. The purpose of stopper element 146 is to plug the proximal end of the corresponding central section 116 to protect the filter medium therewithin and to prevent the medium from accidentally being removed from the tube.

In use, each tube is provided with its filter medium and the tubes are then stacked in a certain order determined by the way in which it is desired to filter the fluid passing through the column.

The use of cover 136 allows column 110 to be shipped or stored intact. The cover is removed when the column is to be readied for use. Column 10 could also be provided with a suitable cover following the basic teachings of the cover and stopper element shown in FIGS. 3 and 4.

Cover 136 and stopper element 146 present a fluid-tight chamber therebetween when they are in their operative position as shown in FIG. 4. Thus, the chamber can be made sanitary and maintained in this condition so long as the cover and stopper element are in place. A fluid in this chamber will remain uncontaminated and will flow out of the chamber when the cover and stopper element are displaced axially and away from the tube. The fluid may be directed into the chamber in any suitable manner such as by a closable aperture in cover 136 or by the use of a hypodermic needle or the like which penetrates the cover.

Portions 118 of the embodiments illustrated in FIG. 4 serve as a funnel for fluid which is to be directed into the respective filter media. In this way, a relatively large volume of fluid can be directed into the enlarged portion and can gravitate through the corresponding filter media in accordance with the properties of such media.

FIGS. 5 and 6 illustrate covers of other constructions for closing the entrance ends of columns 10 and 110, respectively. In FIG. 5, cover 36 has a tuubular wall 38 provided with outer, annular projections 40 thereon, sealingly engageable with the inner surface of the corresponding enlarged portion 18. The inner end of wall 38 complementally seats in extension 22 and a closure 42 is secured to this inner end to engage and close the proximal end of central section 16. An annular flange 44 at the outer end of wall 38 is sealingly engageable with the outer end of portion 18.

In FIG. 6, cover 136a has a tubular wall 138a provided with an inner, annular beveled closure 142a which is sealingly and complementally engageable with surface 148a to close the adjacent central section 116a. An outer, annular flange 144a is sealingly engageable with the outer end of portion 118a.

A third embodiment of the filtration column, denoted by the numeral 210 and shown in FIGS. 7 and 8, includes a number of substantially identical tubes 212, each tube 212 having a slightly enlarged portion 218 at one end thereof and an apertured, flat tip member or closure 220 from which a tubular stem 234 projects. The end of each tube 212 having the aperture is complementally receivable within and frictionally engageable with enlarged portion 218 of the other tubes of column 210 so that the tubes can be interchangeably connected and used in the manner set forth above for filtration purposes when filter media are in respective tubes.

A stopper or plug 236 may be used for closing the outermost enlarged portion 218 of column 210 when it is desired to store or transport the column intact. A removable funnel 238 is connected, as shown in FIG. 8, to the column when the latter is put to use for directing a fluid into the column.

An application of the use of column 210 is illustrated in FIG. 9 wherein a hypodermic needle 240 is coupled by a conical tip member 242 to one end of column 210 which is comprised of a pair of tubes 212, each having a filter medium therewithin. The tubes are stacked so as to be in end-to-end relationship. A syringe unit 244 is coupled to the opposite end of the column and is adapted for suction or pressure application.

What is claimed is:

1. In filter apparatus: a pair of filter tubes, each tube having a central section, an inner extension communicating with the central section at one end thereof and having an inner cross section enlarged relative to the inner cross section of the central section, an enlarged portion communicating with the inner extension and having an inner cross section enlarged relative to the inner extension, the latter being positioned intermediate the central section and the enlarged portion, and a perforate tip member removably mounted on the opposite end of the central section, the tip member of each tube being complementally receivable within the inner extension of the other tube, whereby the tubes can be releasably and interchangeably stacked to form a filtration column.

2. In filter apparatus as set forth in claim 1 wherein said first enlarged portion is provided with a conical inner face, said tip member having a conical surface engageable with said inner face of said first enlarged portion when the tip member is inserted therein.

3. Filter apparatus comprising a pair of tubes, each tube having a central section, an inner extension at one end of the central section, a tip member at the opposite end of the central section, and an enlarged cross section, tubular enlarged portion communicating with the inner extension and the central section and forming an end of the corresponding tube, the inner extension of each tube having an inner surface substantially complemental to the outer surface of the tip member of the other tube, the tubes being positionable in end-to-end relationship with the tip member of one tube being releasably and complementally receivable within the inner extension of the other tube, whereby the tubes can be releasably and interchangeably stacked relative to each other and each enlarged portion defines an enlarged cross section funnel and fluid storage whenever the corresponding tube is positioned as an outermost tube of the apparatus, and a filter medium in the central section of each tube respectively.

4. Filter apparatus as set forth in claim 3 wherein is provided a closure for the enlarged portion of the outermost tube, said closure including a cover frictionally engageable with the outer end of said enlarged portion of said one tube, said cover having means thereon for closing the junction between an inner extension and the adjacent central section.

5. A container comprising: a central tubular section; an enlarged tubular portion secured to and extending outwardly from said central section at one end of the latter and communicating therewith, the enlarged portion having an enlarged cross section relative to the central section; a cover removably mounted on the outer end of said enlarged portion for closing the same, said cover having means for removably closing the proximal end of said central section.

6. A container as set forth in claim 5, wherein said cover includes a tubular wall having a generally flat inner closure engageable with said proximal end of said central section, said closure defining said closing means, said wall having an outer, annular projection sealingly engageable with the inner surface of said enlarged portion.

7. A container as set forth in claim 5, wherein said cover includes a tubular wall having a beveled inner closure engageable with the proximal end of said center section, said closure defining said closing means.

8. A container comprising: a first tubular section; a second tubular section secured to said first section at one end of the latter and communicating therewith, the second section having an enlarged cross section relative to the first section; a cover removably mounted on the outer end of said second section for closing the same, said cover having a stem positionable within said enlarged section and provided with a stopper element on the inner end thereof for removably closing the proximal end of said first section.

9. A filter tube comprising: a first tubular section; a second tubular section secured to said first section at one end of the latter and communicating therewith, the second section having an enlarged cross section relative to the first section; an enlarged tubular portion communicating with the second section and having an enlarged cross section relative to the second section and an interior transverse dimension exceeding an exterior transverse dimension of the first tubular section, said sections defining a filter tube and said tubular portion defining an end of the filter tube; and releasable cover means accessible from said filter tube end for closing the end of the first tubular section.

References Cited
UNITED STATES PATENTS

| | | | |
|---|---|---|---|
| 565,890 | 8/1896 | Fowler | 210—339 |
| 3,295,686 | 1/1967 | Krueger | 210—474 X |
| 556,507 | 3/1896 | LaFrance | 137—516.25 X |

REUBEN FRIEDMAN, Primary Examiner

T. A. GRANGER, Assistant Examiner

U.S. Cl. X.R.

210—239